United States Patent [19]
Aizawa

[11] Patent Number: 6,013,017
[45] Date of Patent: Jan. 11, 2000

[54] PUNCH PRESS MACHINE

[75] Inventor: Hideto Aizawa, Inuyama, Japan

[73] Assignee: Murata Kikai Kabushiki Kaisha, Kyoto, Japan

[21] Appl. No.: 09/083,403

[22] Filed: May 22, 1998

[30] Foreign Application Priority Data

Jun. 16, 1997 [JP] Japan ..................................... 9-158641

[51] Int. Cl.$^7$ ................................................. B23Q 3/155
[52] U.S. Cl. ............................... 483/29; 72/446; 83/559; 83/563
[58] Field of Search ................................ 483/1, 28, 29; 29/50, 51, 52; 72/446, 448, 442; 83/549, 552, 559, 563, 564

[56] References Cited

U.S. PATENT DOCUMENTS

| | | | |
|---|---|---|---|
| 3,780,423 | 12/1973 | Lilienthal et al. | 483/60 |
| 4,387,502 | 6/1983 | Dom | 483/29 |
| 4,486,941 | 12/1984 | Scott et al. | 483/29 |
| 4,587,716 | 5/1986 | Bytow | 483/29 |
| 4,646,600 | 3/1987 | Flick et al. | 483/29 |
| 4,682,401 | 7/1987 | Tadashi et al. | 483/28 |
| 4,901,427 | 2/1990 | Sakamoto et al. | 72/446 |
| 4,951,375 | 8/1990 | Erlenmaier | 483/29 |
| 5,224,915 | 7/1993 | Kilian | 483/29 |
| 5,318,496 | 6/1994 | Takahashi | 483/29 |
| 5,342,276 | 8/1994 | Fujiwara et al. | 72/446 |
| 5,669,866 | 9/1997 | Julian et al. | 483/29 |
| 5,778,749 | 7/1998 | Dunn | 483/28 |

FOREIGN PATENT DOCUMENTS

| | | |
|---|---|---|
| 4-13424 | 1/1992 | Japan . |
| 5-285570 | 11/1993 | Japan . |

*Primary Examiner*—Daniel W. Howell
*Attorney, Agent, or Firm*—Armstrong Westerman Hattori McLeland & Naughton

[57] ABSTRACT

A punch press machine that enables relatively more tools to be provided without substantially increasing the area taken up by the machine. This invention applies to a punch press machine provided with a work moving means 11 for moving a work sheet W within a single axial direction X over a work table 10 and a tool moving means 12 for moving punch 5 and die 6 within an axial direction perpendicular Y to the axial direction in which the work sheet W is moved. A plurality of punches 5 and dies 6 are arranged in cartridges 7, 8. A plurality of tool magazines 3a are arranged in a tool magazine group 3 in a line parallel to the work table 10, and a tool exchange device 4 for exchanging tools is arranged between the tool magazines 3a and the tool moving means 12. This tool exchange device 4 is moveable in the same axial direction X as the work sheet, and is arranged between the tool magazine group 3 and the work table 10.

5 Claims, 11 Drawing Sheets

PUNCH PRESS MACHINE

FIELD OF THE INVENTION

The present invention relates to a punch press machine which, when performing punching operations, moves a work sheet within a first axial direction and moves tool like a punch and a die within a second axial direction perpendicular to the first axial direction in which the work sheet is moved.

BACKGROUND OF THE INVENTION

Conventionally, punch press machines perform punch processing with tools like punches and dies at a fixed punching position, and move the work sheet to the punching position within two axial directions perpendicular to each other. When a work sheet of sheet metal is moved within two axial directions, however, the amount of space the machine takes up is increased. Further, when the work sheet is moved either between front and back or right and left, since the work sheet rubs against either the surface of the work table or free bearings arranged on the table surface, abrasions form easily on the surface of the work sheet.

In order to resolve this problem, a punch press machine which moves the work sheet within only one axial direction (a first axial direction), and whereby a punching position is determined by moving the tools within an axial direction perpendicular to the axial direction in which the work sheet is moved (a second axial direction) has previously been proposed.

Since the punching position in such a punch press machine changes, the punch press machine does not utilize a conventional common turret to hold the tools. Instead, previous punch press machines have stored a plurality of punches and dies in a tower-like tool magazine comprised of multiple levels of peripheral racks arranged behind the machine body from where the desired tool is picked up and moved to the punching position by a tool exchange device.

Such a tower-like tool magazine, however, despite being relatively compact in and of itself, makes efficient utilization of factory floor space difficult, since when added to the tool exchange device behind the body of a punch press machine that is already quite wide, the tool magazine at least partially jutts out. Moreover, the area taken up by the punch press machine including the entire width of the rectangular portion comprising the tool magazine and the body of the punch press machine occupies a lot of floor space.

Furthermore, since the tools that are not in use are stored in the multiple levels of peripheral racks of the tool magazine, retooling operations such as exchanging the tools prepared in the tool magazine and replacement of old tools with new ones is troublesome.

SUMMARY OF THE INVENTION

It is an object of the present invention to solve the aforementioned problems of the conventional technology by providing a punch press machine that moves a work sheet within one axial direction, thereby reducing the amount of space actually taken up by the machine, and further, which simplifies retooling of the machine.

It is a further object of the present invention to enable the arrangement of relatively more tools without increasing the amount of practical floor space taken up by the machine.

It is still a further object of the present invention to enable replacement of a plurality of tools at one time, thereby reducing the overall number of times tools are replaced, and whereby, even when utilizing a variety of tools to process a single work sheet, greater punch processing efficiency is achieved.

The punch press machine of the present invention is a punch press machine provided with a work moving means for moving the work sheet within a first axial direction, a work table arranged in the first axial direction along which the work sheet is moved, a tool moving means for moving the tools within a second axial direction perpendicular to the first axial direction in which the work sheet is moved, the punch press machine comprising a tool magazine group containing a plurality of tool magazines arranged in parallel to the work table, and wherein a tool exchange device moveable within the axial direction in which the work sheet is moved is arranged between the tool magazine groups and the work table.

The tool exchange device exchanges the tools between the tool magazines and the tool moving means. The tool magazines may store each of a plurality of tools individually, or may contain a holding member for holding a plurality of tools.

In the punch press machine of the present invention, the tool exchange device pulls out a desire tool from the desired tool magazine and provides the tool to the tool moving means, and the punch press machine performs punching operations by moving the work sheet within a first axial direction with the work sheet moving means and by moving the tools to a punching position with a tool moving means which moves within an axial direction perpendicular to that in which the work sheet is moved. Since the work is only moved within a single axial direction, the amount of space taken up by the work table is reduced.

Further, since the axial direction in which the tool magazine groups and the tool exchange device are moved is parallel to that of the work table, large portions jutting out from the table can be eliminated, and the actual space taken up by the machine can be further reduced.

Still further, since the tool magazine groups are lined up in a straight line, an operator can approach a desired tool magazine from behind and easily retool the tools stored in the tool magazine.

Comprised as described above, the tool magazine groups can be arranged for approximately the same length as the work table. Thus arranged, the tool magazines and the work table will occupy approximately the same rectangular amount of floor space, making efficient use of the workshop area, and allowing additional layers of tools to be stored in the tool magazines without effectively increasing the amount of space taken up by the machine.

Further, in the above-described composition, a plurality of tools may be held in the cartridges, and the tool exchange device and the tool magazine groups may contain replacement tools in each cartridge. Thus, a plurality of tools can be exchanged at the same time, and the number of times the cartridges must be exchanged during operation can be reduced. Thus, during punch processing wherein it is necessary to utilize a plurality of tools for a single work sheet, exchange of tools in the tool magazines can be made unnecessary, or at least the number of times that the tools must be replaced is reduced, thereby improving the processing efficiency of the machine.

BRIEF DESCRIPTION OF THE ACCOMPANYING DRAWING

FIGS. 14A, 14B, 14C, 14D, 14E and 10F are diagrams explaining the maintenancing of a cartridge of a tool magazine in a punch press machine of FIG. 1.

DETAILED DESCRIPTION OF THE PREFERRED EMBODIMENTS

A first embodiment of the present invention will now be explained in reference to the accompanying drawings. First, an overview of the entire structure will be described.

This punch press machine 1 is comprised of a main body 2 of the punch press machine 1, tool magazine groups 3, and a tool exchange device 4. A plurality of punches 5 are arranged in upper cartridge 7, and a plurality of dies 6 are arranged in lower cartridge 8. These cartridges 7, 8, are exchanged by the tool exchange device 4 which is positioned between the main body 2 and the tool magazines 3.

The main body 2 of the punch press machine 1 moves a work sheet W on top of a work table 10 which extends out from both sides of a frame 9. The work sheet W is moved within a single axial direction (lateral axial direction X) by a work sheet moving means 11. A punch 5 and a die 6 are moved in an axial direction perpendicular to that of the work sheet movement (longitudinal axial direction Y) into position by a cartridge moving means 12, and the punch 5 is raised and lowered by a moveable press head 13 to perform the punching. The cartridge moving means 12 is a tool moving means.

The tool magazine group 3 arranges tool magazines 3a containing the individual cartridges 7, 8 at a fixed location in parallel to the work table 10, and moreover, extends a line of the tool magazines 3a along the approximate length of the work table 10. Further, the tool magazine group 3 is provided with support legs 15 (shown in FIG. 2B) arranged at a predetermined height.

The cartridges 7 and 8 are set at a cart 19. The tool exchange device 4 exchanges the cartridges 7, 8, and the cart 19 runs along a rail 20 arranged between the work table 10 and the tool magazine group 3.

Figure 2A:
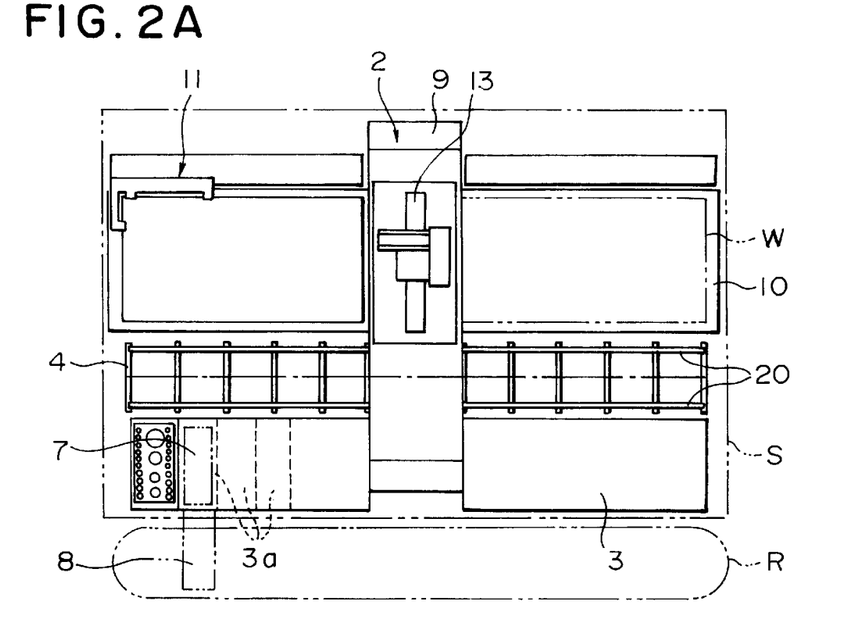
FIG. 2A is a planar view of the punch press machine of FIG. 1.
Figure 2B:
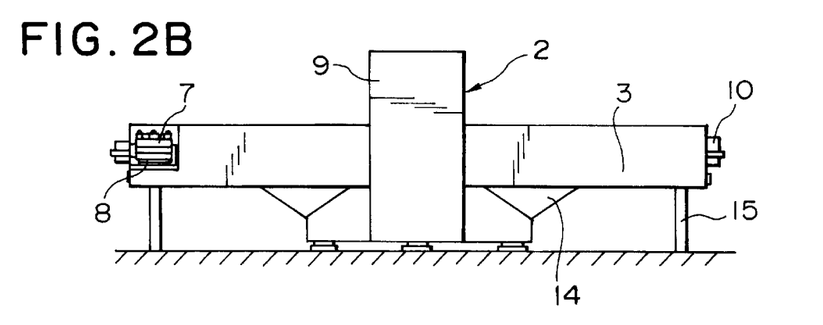
FIG. 2B is a front view of the punch press machine of FIG. 1.
Figure 2C:
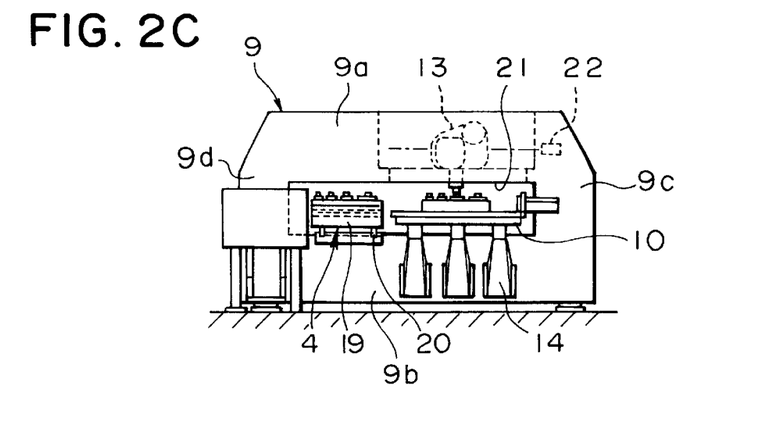
FIG. 2C is a side angle view of the punch press machine of FIG. 1.

The sides of the frame 9 of the main body 2, as shown in FIG. 2C, form a square hollow cavity section extending from rear to front, bordered by the upper frame section 9a, the lower frame section 9b, and the front and rear frame sections 9c, 9d. The work table 10 is arranged in a cavity 21 between the upper and lower frames 9a, 9b, and the tool exchange device 4 is arranged in the rear section of the cavity 21. Further, the cartridge moving means 12, and a press head moving means 22 for moving the press head 13 back and forth are arranged in the upper frame 9a.

Next, each part will be explained in detail.

Figure 1:
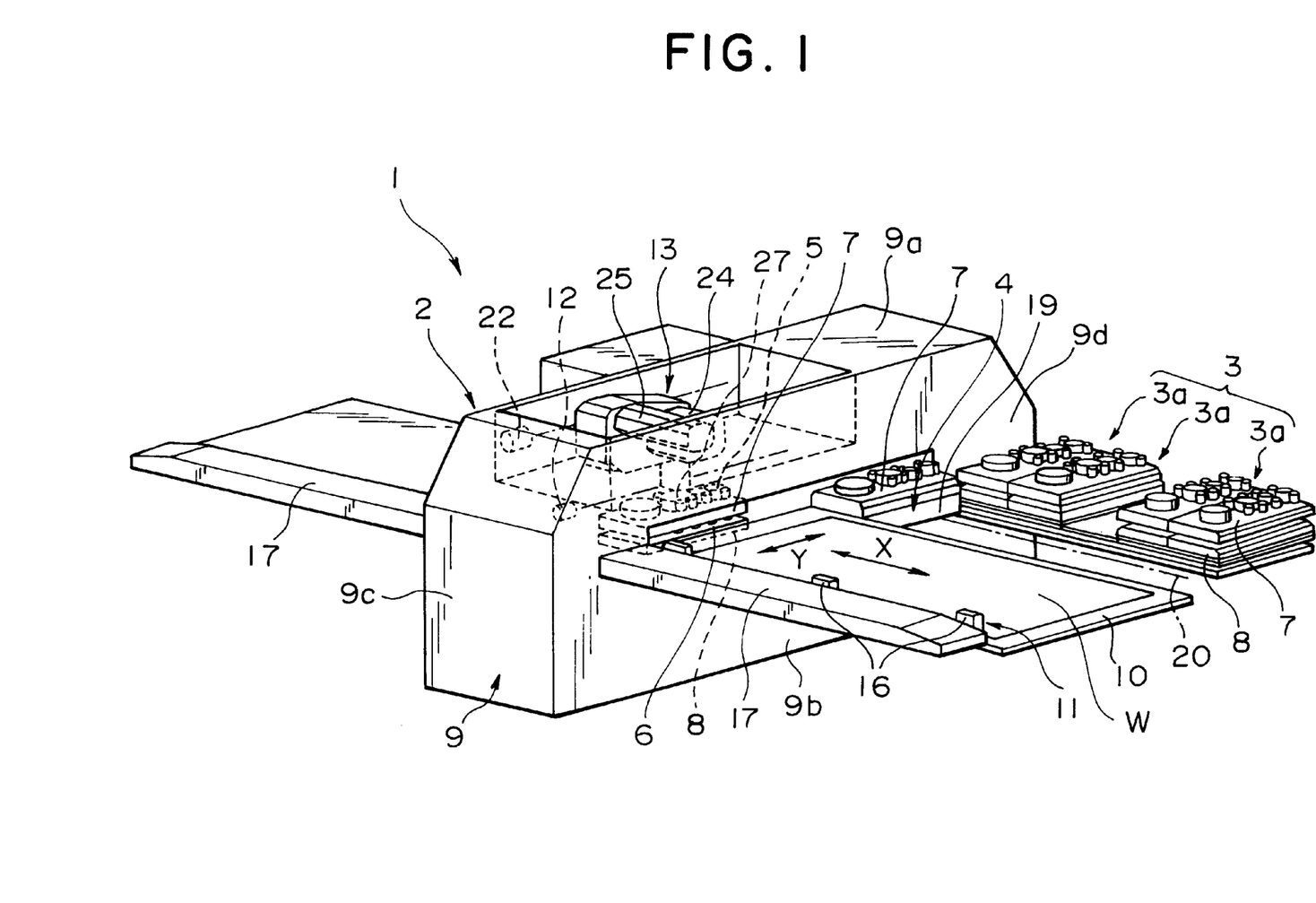
FIG. 1 is a perspective view of a punch press machine according to the first embodiment of the present invention.

Referring to FIG. 1, the work sheet moving means 11 is provided with a plurality of work holders 16 for clamping the front end of the work sheet W on the work table 10. A slide member (not shown in the drawings) is moved in the lateral axial direction X by a moving mechanism (not shown in the drawings) comprised of a servo motor and a screw. The moving mechanism and the slide member are contained inside a cover 17 which is arranged along the front end of the work table 10.

The work table 10 is rectangular, extending out in the lateral axial direction X, and as shown in FIGS. 2B and 2C, is supported by brackets 14 jutting from the sides of both ends of the frame 9. Both ends of the work table 10 are also supported by supporting legs (not shown in the drawings) affixed to the ground. Independently rotatable rollers (not shown in the drawings) extend over the entire surface of the work table 10 from rear to front in the Y axial direction such that when the work sheet W is moved it is held such that it rolls over the rollers. Furthermore, brushes (not shown in the drawings) are arranged between the rollers in order to prevent abrasions from forming on the bottom surface of the work sheet W when it is moved.

Figure 4A:
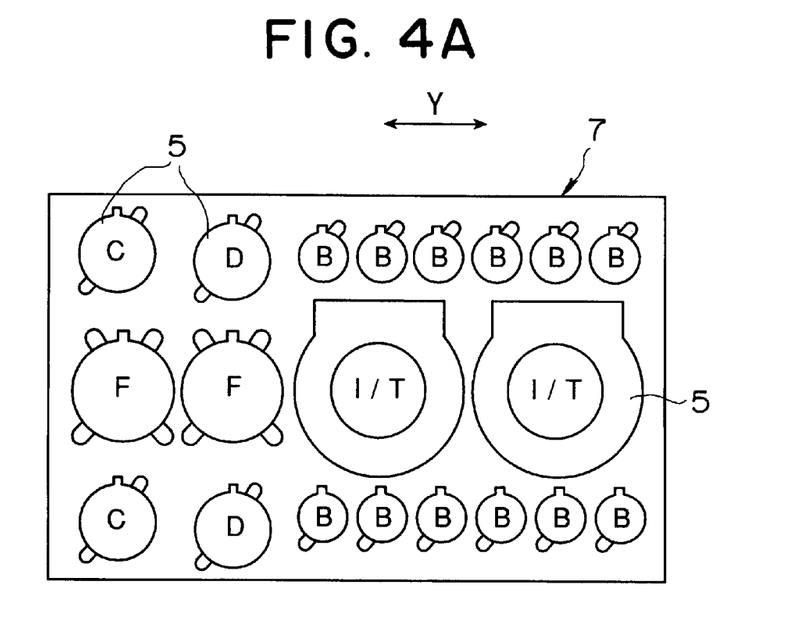
FIG. 4A and FIG. 4B are planar drawings showing an example of various tools in the cartridges of a punch press machine according to the present invention.
Figure 4B:
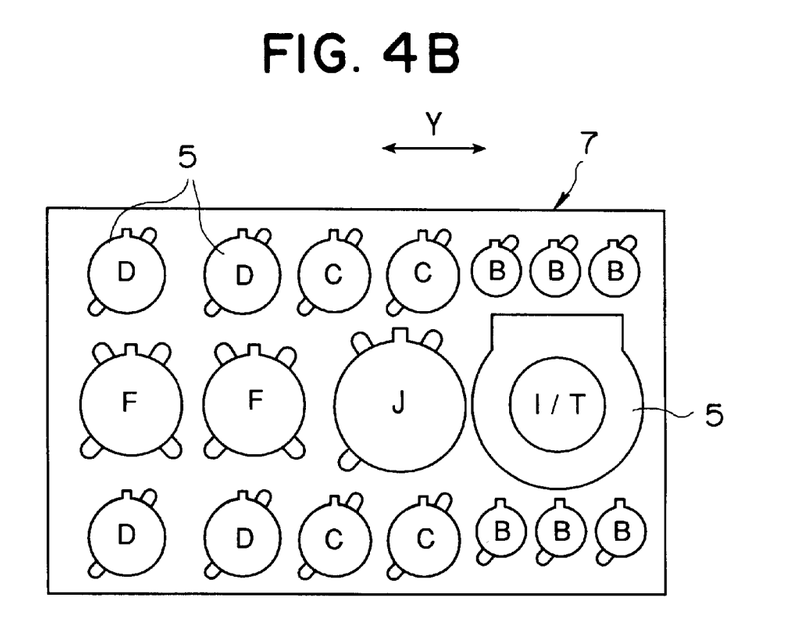

The upper cartridge 7, as shown in FIGS. 4A and 4B which shows examples of a variety of tools, is comprised as a rectangle which extends longitudinal (in the Y axial direction). Each type of punch 5 is arranged in a plurality of rows (3 rows in this example) lined up longitudinally (in the Y axial direction). Each punch 5 is arranged so as to independently rise and fall within a guide hole provided in the cartridge 7, and is held at the top by an elevating means (not shown in the drawings) like a spring member. Each of the letters B, C, D, F, J attached to each punch in FIGS. 4A and 4B indicates a distinct tool type. Among these tool types, the punch 5 indicated by I/T is a rotary index tool which changes the rotary angle around which the tool is centered.

The lower cartridge 8 in FIG. 1 is arranged opposite the upper cartridge 7, and each of the plurality of dies 6 on the lower cartridge 8 corresponds to each of the plurality of punches 5 of the upper cartridge 7.

Figure 5A:
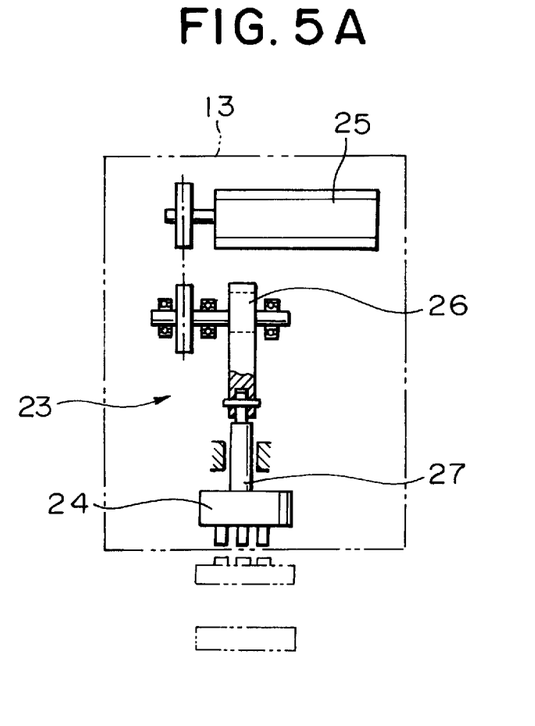
FIG. 5A is a semi cross section drawing showing a front view of the punch press head of the punch press machine of the present invention in outline form.
Figure 5B:
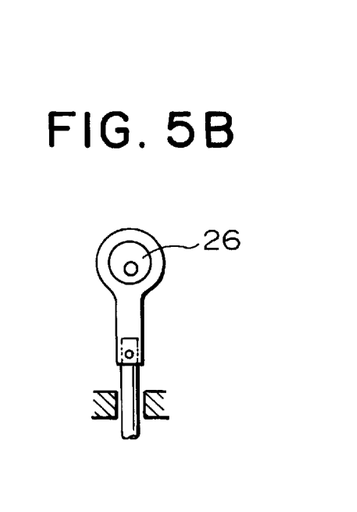
FIG. 5B is a partial front view of the punch press head shown in FIG. 5A.

The press head 13 (FIG. 1) drives the desired punch 5 of the upper cartridge 7, the cartridge being longitudinally positioned by the cartridge moving means 12, and is arranged in the upper frame 9a such that it can be moved in the longitudinal Y axial direction by the press head moving means 22. Further, the press head 13, as indicated by the outline drawings in FIG. 5A and 5B is provided with a punch driving member 23 and a ram selector 24 such that the press head 13 can drive the desired punch 5 of the upper cartridge 7.

The punch driving member 23 drives the rise and fall of a ram 27 at variable stroke speeds via the straight alternating movement of a drive changing mechanism 26 which is alternated by the rotation of a crank shaft consisting of an eccentric cam driven by a servo motor 25, the servo motor 25 comprising the punch driving source.

Figure 6:
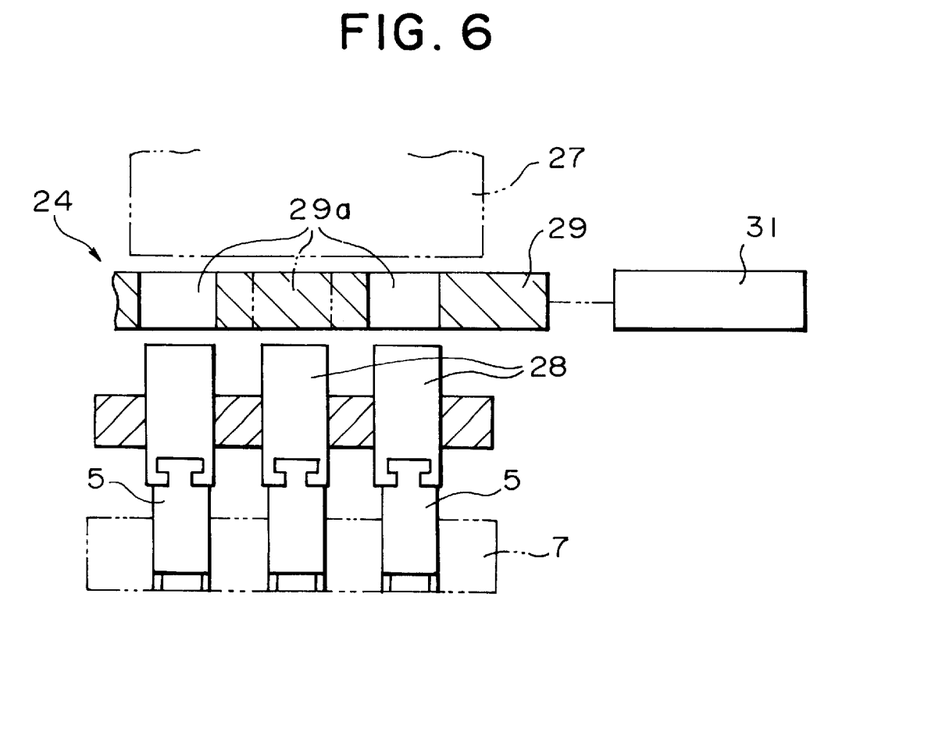
FIG. 6 is a cross section drawing of the ram selector in the punch press machine of the present invention.

The ram selector 24, as shown in the example in FIG. 6, drives the plurality of individual rams 28 (3 rams in the present example) which engage with the individual punches 5 by the driving of a single upper ram 27 through a moveable ram selecting member 29. The ram selecting member 29 is provided with multiple openings 29a into which the tops of the individual rams 28 can fit, and which can be advanced and withdrawn, or rotated, by the driving of selection driving source 31, such that the desired individual rams 28 correspond to the openings 29a. Only the individual rams 28 which do not correspond to the openings 29a of the ram selecting member 29 are driven down by the driving of the ram 27, and so only a punch 5 which corresponds to the individual ram 28 can be driven.

Figure 7A:
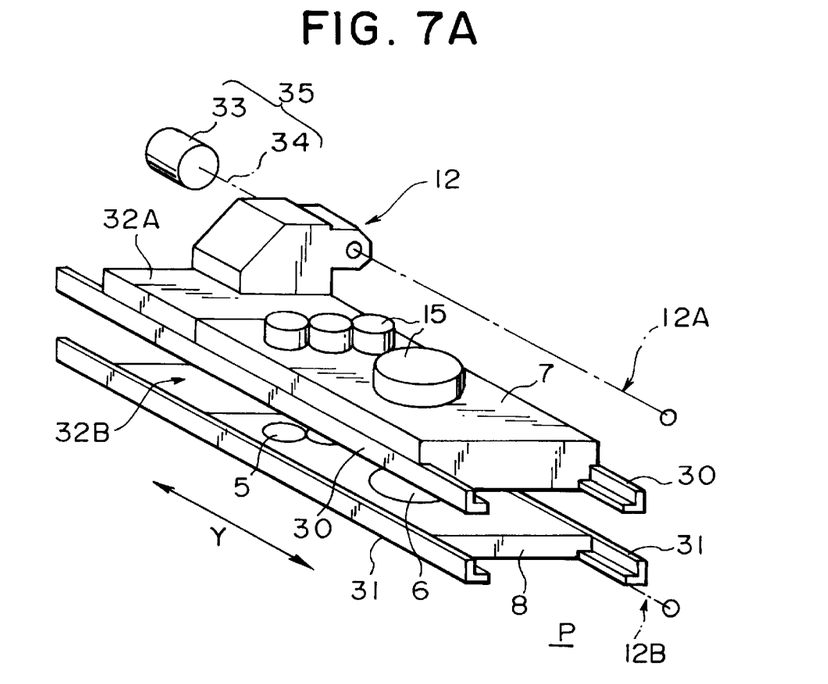
FIG. 7A is a perspective drawing showing the cartridge moving means during operation in the body of the punch press machine of the present invention.

As shown in FIG. 7A, the cartridge moving means 12 is comprised of an upper cartridge moving means 12A and a lower cartridge moving means 12B. The upper cartridge 7 and the lower cartridge 8 are arranged so as to freely withdraw from and extend into the upper and lower cartridge rails 30, 31, respectively, in a longitudinal axial direction Y, to be passed into the upper and lower frames 9a, 9b (FIG. 1), respectively. The upper cartridge moving means 12A and the lower cartridge moving means 12B advance and withdraw the upper and lower cartridges 7, 8, arranged as described above, through an upper cartridge drive member 32A and a lower cartridge drive member 32B which are detachably connected by a connecting means (not shown in the drawings). The upper cartridge drive member 32A and the lower cartridge drive member 32B advance and withdraw cartridges placed on an upper cartridge rail 30 and a lower cartridge rail 31 via a driving device 35 comprised of a motor 33 and a ball screw 34.

Figure 7B:
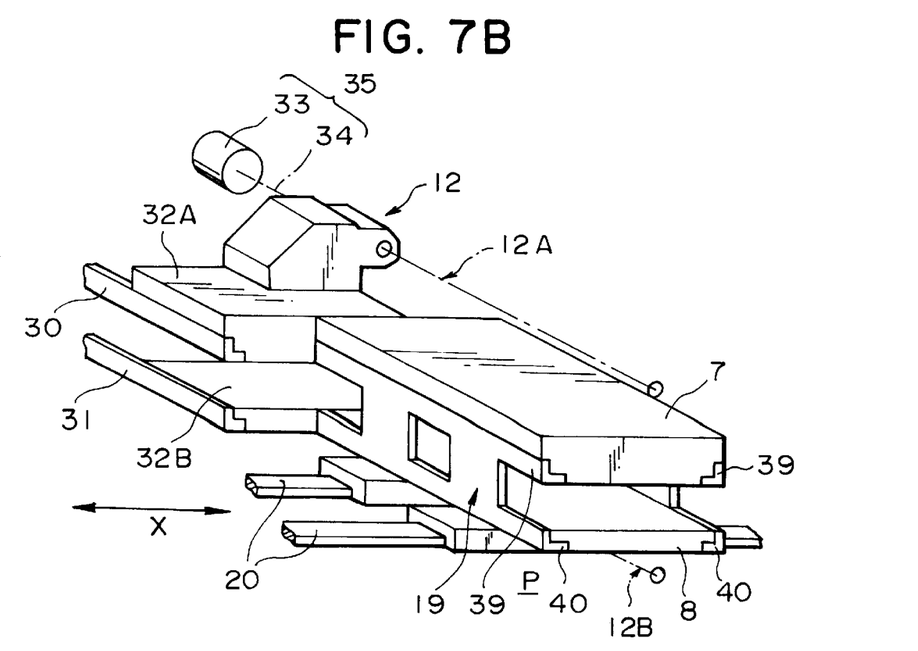
FIG. 7B is a perspective drawing showing the cartridge moving means during operation at the tool exchange position.

A cartridge exchange position P where the cartridges meet the tool exchange device 4 is located at the transport terminus of the upper and lower cartridges 7, 8 driven by the cartridge moving means 12 (the position P indicated in FIG. 7B). This cartridge exchange position P is, in other words, the tool exchange position in the main body 2.

Figure 8:
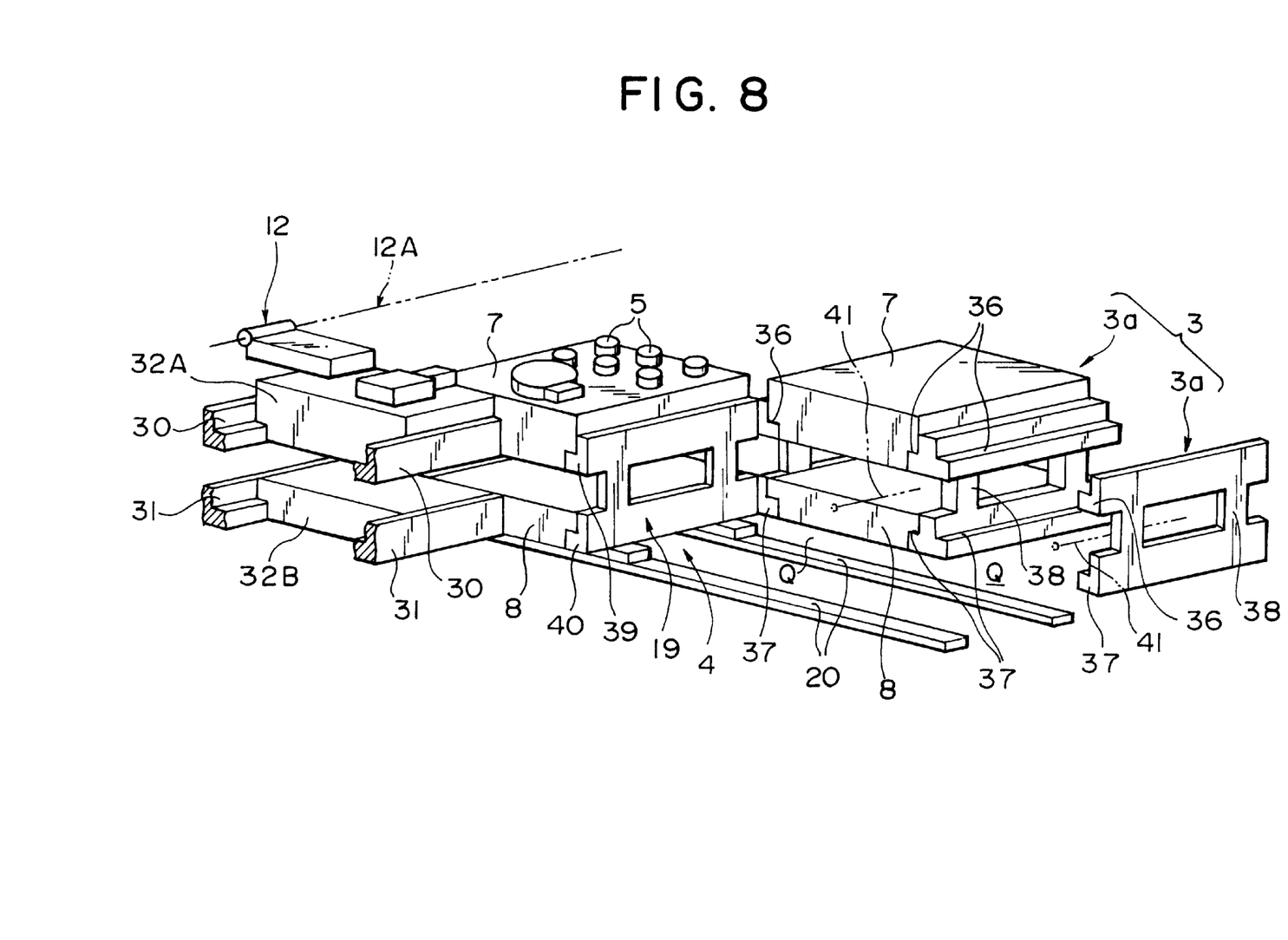
FIG. 8 is a perspective diagram showing the relationship between the tool exchange device and the tool magazine/ cartridge moving means.

As shown in FIG. 8, each upper and lower cartridge 7, 8 contained in each tool magazine 3a of the tool magazine group 3 is placed on its respective upper or lower rail 36, 37 such that it is independently removable. The rails 36, 37 of the neighboring tool magazines 3a are provided with a common rail support frame 38. The entrance opening portion on the tool exchange device 4 side of each tool magazine 3a forms the tool exchange position Q on the magazine side.

The tool exchange device 4 is provided with support rails 39, 40 which support the upper cartridge 7 and the lower cartridge 8 such that they can be placed on the support rails 39, 40 and freely advanced or withdrawn. The tool exchange device 4 is comprised of the cart 19, and a magazine loading and unloading mechanism 41 which loads and unloads the tool magazines 3a of the cartridges 7, 8 riding on the cart 19, the mechanism provided in each of the tool magazines 3a. The magazine loading and unloading mechanism 41 can alternatively be provided in the cart 19 instead of in each tool magazine 3a.

Figure 12:
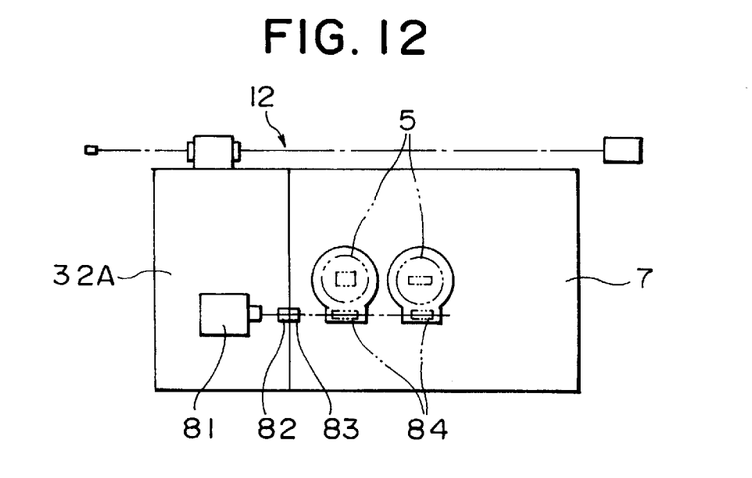
FIG. 12 is a planar diagram showing the structure of the driving means of the index positioning tool arranged in the cartridge moving means in outline form in the punch press machine of the present invention.
Figure 13:
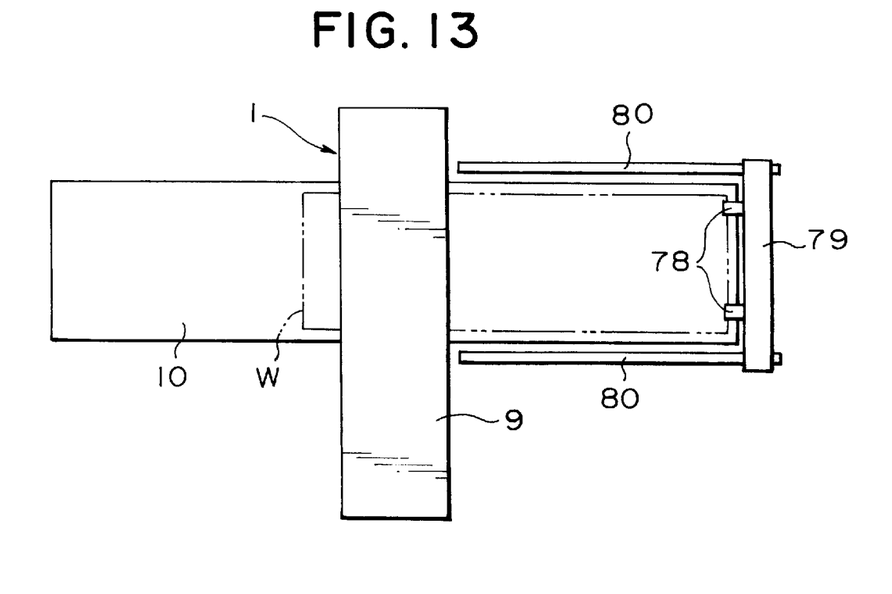
FIG. 13 is a planar diagram of an alternate embodiment of the punch press machine of the present invention.

As shown in FIG. 12, when the punch 5 and die 6 of the cartridges 7, 8 are used as the rotary index tools, a tool rotary indexing device (motor) 81 which sets the rotary position of a coupling 82 is provided in the cartridge driving members 32A, 32B of the cartridge moving means 12. A coupling 83 which can be freely connected and removed from the coupling 82, and a rotary transmitting mechanism 84 for transmitting the rotation of the coupling 83 to the punch 5 and die 6 are provided. When tools are exchanged, the couplings 82, 83 are joined, and when necessary, are rotated by the driving of the tool rotary indexing device 81.

Figure 3:
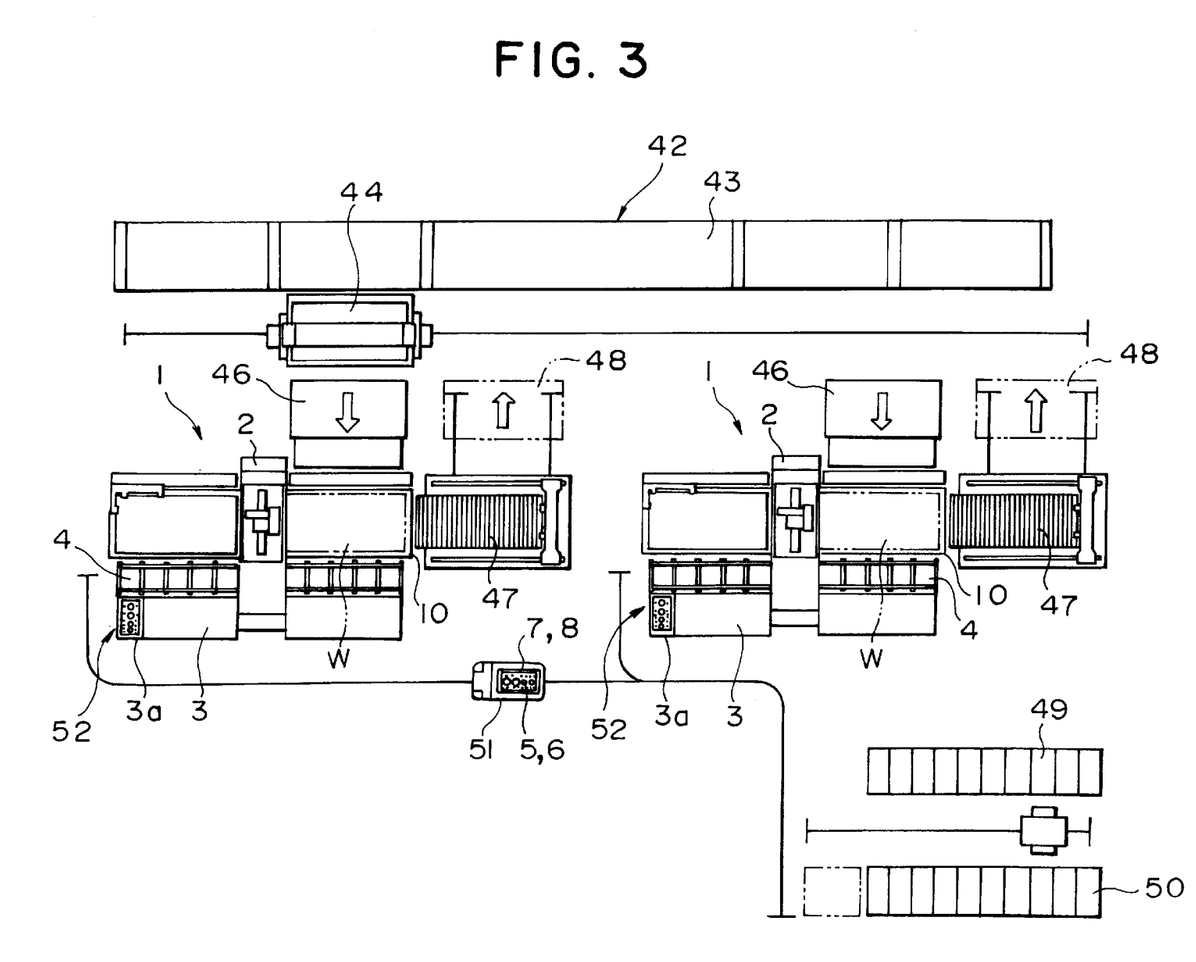
FIG. 3 is a layout drawing of the punch processing line arranged in the punch press machine of FIG. 1.

FIG. 3 is a drawing depicting the layout of the punch processing line arranged in the punch press machine 1 structured as described above.

Two punch press machines 1, 1 are arranged so as to face an automatic storage unit 42. The automatic storage unit 42 is comprised of a rack 43 which stores both pre-processed and processed work sheets, and a stacker crane 44 which runs along the rack 43. A supply cart 46 is arranged in front of the work tables 10 of each punch press machine 1 such that it can transport a work sheet W supplied between the punch presses 1, 1 and the stacker crane 44. Further, an unloader 47 is arranged at the far end in front of each punch press machine 1 such that it can unload the processed work sheets. A cart 48 for processed work sheets is arranged in front of each unloader 47 for transporting the processed work sheets between the unloader 47 and the stacker crane 44.

A tool stacker 49 and a stacking station 50 are arranged at a distance from the rear of the punch press machines 1. The cartridges 7 and 8 are transported and exchanged between an outer tool exchange station 52 which is comprised of the tool magazine group 3 of the tool magazines 3a for the punch press machines 1, and between the stacking station 50 through track-bound automated transport cart 51.

The operation of the structure as described above will now be explained.

In FIG. 1, the work sheet W on the work table 10 of the punch press machine 1 is moved in a lateral axial direction X by the work moving means 11. Further, the cartridges 7, 8 inside the main body 2 of the punch press machine 1 are moved in a longitudinal axial direction Y by the cartridge moving means 12. In this way, the desired punch 5 and die 6 in the cartridges 7, 8, respectively, are positioned on the work sheet W. The press head moving means 22 moves the press head 13 such that the punch 5 used for punching and its cartridge 7 is moved longitudinally in the Y axial direction to a location corresponding to the position of the ram 27. Further, the desired row of punches 5 of the cartridge 7 is selected by the ram selector 24 of the press head 13. Once in this arrangement, the press head 13 is driven, driving the desired punch 5 such that punch processing is performed.

A plurality of different types of punches 5 and dies 6 are arranged in each cartridge 7, 8 set in the tool magazine group 3, and the cartridges 7, 8 are exchanged between the main body 2 and the tool magazine group 3 as necessary according to the type of processing performed on the work sheet W.

This cartridge exchange takes place as follows.

As shown in FIG. 7A, the upper and lower cartridges 7, 8 arranged on the rails 30, 31 inside the main body 2 are advanced to the cartridge exchange position P at the far end of the rails 30, 31 by the cartridge drive members 32A, 32B of the cartridge moving means 12. At this time, the cart 19 of the tool exchange device 4 is in a stand-by condition at the cartridge exchange position P, and when the cartridges 7, 8 are advanced, the upper and lower cartridges 7, 8 are mounted on the upper and lower support rails 39, 40 of the cart 19 (FIG. 7B).

The cart 19 thus loaded with the cartridges 7, 8, moves to the position corresponding to the predetermined empty tool magazine 3a as shown in FIG. 8, where the cart 19 stops. The cartridges 7, 8 mounted on the cart 19 are then pulled into the tool magazine 3a by the magazine loading and unloading mechanism 41 provided in the tool magazine 3a.

The emptied cart 19 then moves to a position corresponding to the tool magazine 3a containing the next cartridges 7, 8 to be picked up. These cartridges 7, 8 are then mounted on the cart 19 by the magazine loading and unloading mechanism 41 provided in the tool magazine 3a.

The loaded cart 19 is then sent to the tool exchange position P in the main body 2 (FIG. 7), where the cartridges 7, 8 are joined to the cartridge driving members 32A, 32B of the cartridge moving means 12 by a joining means (not shown in the drawings), and drawn into the main body 2 by the movement of the cartridge drive members 32A, 32B. The cartridge moving means 12 then, as described above, advances or withdraws the drawn-in cartridges 7, 8 to the desired position for tool selection. In this way, tool exchange can be performed with each cartridge 7, 8.

According to this punch press machine 1, since the work W is only moved within a single axial direction (the lateral X axial direction), the amount of space taken up by the work table 10 is reduced in comparison to a work table that moves the work sheet W within two axial directions.

Further, since a plurality of tools 5, 6 can be held in the cartridges 7, 8, and since each cartridge 7, 8 is exchanged and stored, a plurality of tools 5, 6 can be exchanged at the same time. For this reason, even when a plurality of tools 5, 6 must be used for processing a single work sheet W, exchange of tools in the tool magazine 3a can be made unnecessary, or at least the number of times that the tools must be exchanged can be reduced, thereby improving the processing efficiency of the machine. In this case, since the cartridge moving means 12 for determining the punching position is used, and since the cartridges 7, 8 are exchanged by the tool exchange device 4 at one end of the movement of the cartridge moving means 12, a separate cartridge driving means to perform the exchange operation is unnecessary. Further, even if a driving means is required, a simple device can be employed, and the overall structure of the machine can be simplified.

Furthermore, since the cart's range of movement between the tool magazine group 3 and the tool exchange device 4 runs parallel to the lateral axial direction of the work table 10, a partially jutting region can be eliminated, and the amount of space practically taken up is reduced. Particularly as shown in the example described herein, after arranging the tool magazine group 3 within roughly the same lateral region occupied by the work table 10, as shown in the dotted lines of FIG. 2A, the tool magazine group 3 and the work table 10 can be placed within the same roughly triangular area of floor space increasing space utilization efficiency. This enables many tools 5, 6 to be stored in the tool magazine group 3 without having to increase the practical amount of space used by the punch press machine 1.

Still further, since the tool magazine group 3 contains the tool magazines 3a arranged in a straight line, the rear area of the entire tool magazine group 3 becomes an operational area R for the operator, and an operator can approach a desired tool magazine 3a and easily change the tools 5, 6 of the cartridges 7, 8 stored in the tool magazine 3a. In this case, since it is the cart 19 of the tool exchange device 4 and not the tool magazines 3a that moves, the tool magazines 3a can be replaced by other tool magazines 3a. Because of this, punch processing can be performed while tool exchange takes place, and vice-versa.

Figure 14A:
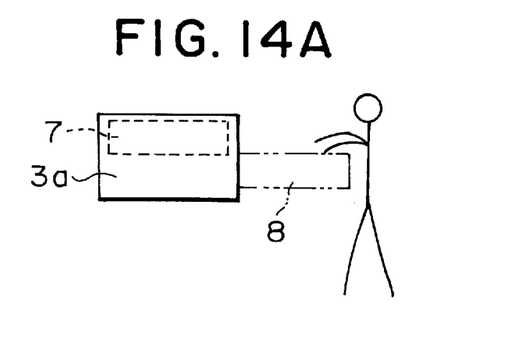
Figure 14B:
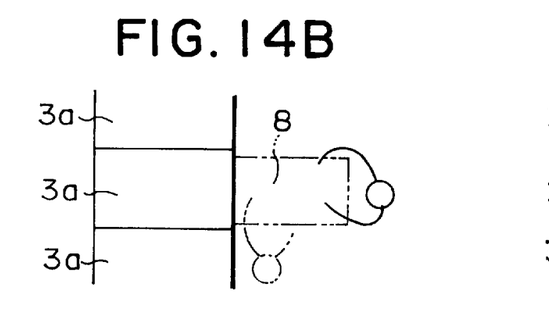
Figure 14C:
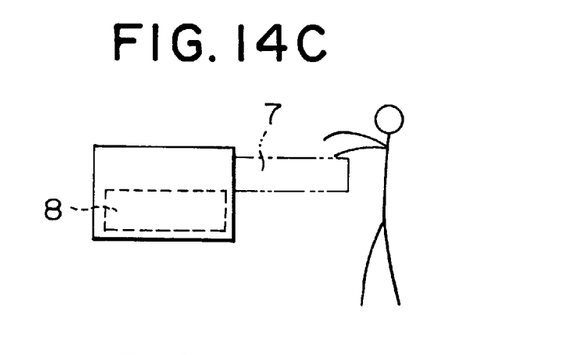
Figure 14D:
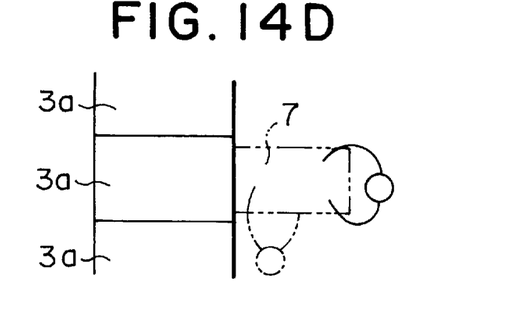
Figure 14E:
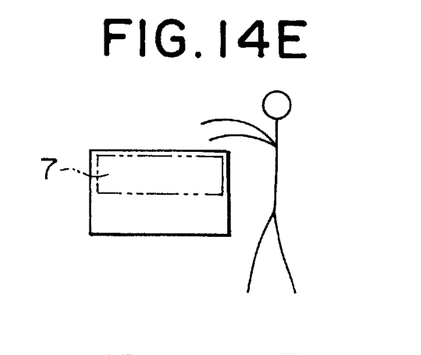
Figure 14F:
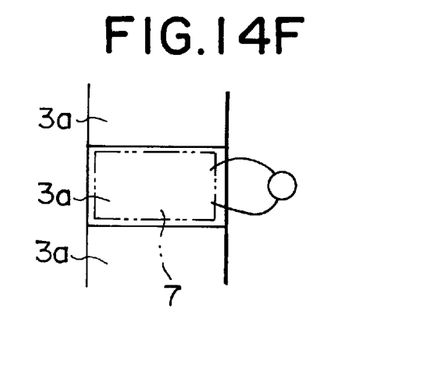

It should be noted that it is preferable for each tool magazine 3a of the tool magazine group 3, as shown in the dotted lines of FIG. 2A and FIG. 14A through FIG. 14D, to allow the upper cartridge 7 and the lower cartridge 8 to be withdrawn from behind each tool magazine 3a. This way, as shown in the side view and planar diagrams of FIGS. 14A and 14B, the lower cartridge 7 will not obstruct maintenance of the lower cartridge 8 when the die 6 of the lower cartridge 8 are maintenanced. Further, even if the upper and lower cartridges 7, 8 become so large, as shown in FIGS. 14E and 14F, that the operator cannot reach the front end of the upper and lower cartridges 7, 8, by withdrawing the cartridges from both the front and the rear, as shown in FIGS. 14B and 14C, the operator can gain access to both ends of the upper and lower cartridges 7, 8. This makes maintenance of the front of the upper and lower cartridges 7, 8 easier for the operator.

Still further, the cartridges can be arranged such that only the lower cartridge 8 is allowed to be pulled out from the rear, and in this way, the upper cartridge 7 will not interfere with maintenancing of the lower cartridge 8, and maintenancing of the dies 6 of the lower cartridges 8 can be made easier. Even if the upper cartridge 7 cannot be pulled out, or if it becomes very large, it can still be maintenanced from above by the operator.

Figure 9:
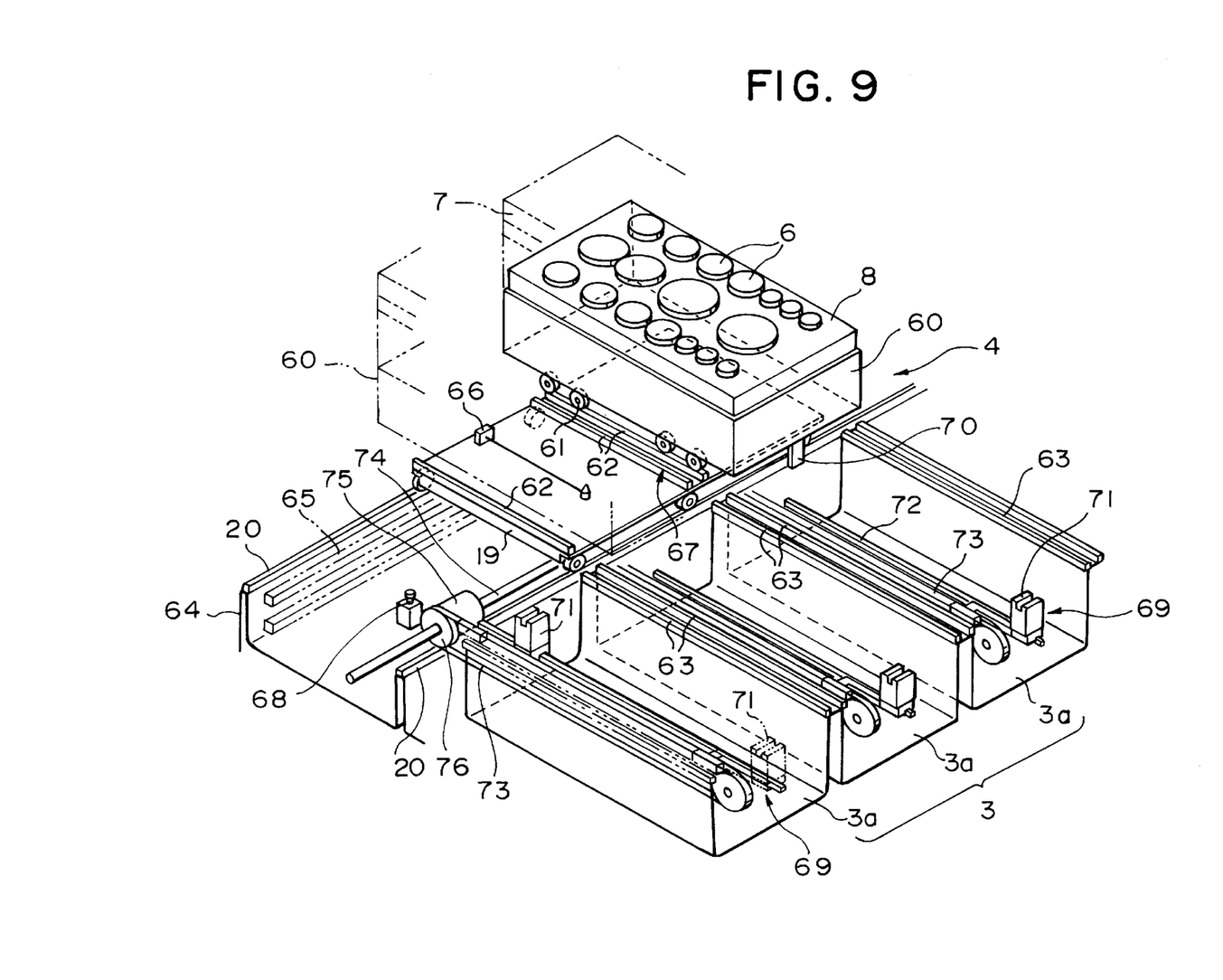
FIG. 9 is a perspective diagram showing the relationship between the tool exchange device and the tool magazine in an alternative embodiment of the present invention.

FIG. 9 and FIG. 10 show alternate embodiments of the present invention.

In these embodiments the structure of the tool exchange device has been altered as described below, but the other structures remain the same.

In this alternate embodiment, two cartridge holders 60 are lined up in parallel in the cart 19 of the tool exchange device 4. Each cartridge holder 60 is held such that it can be independently inserted and removed within the same axial direction as the movement of the cartridge movement (the Y axial direction) by the cartridge moving means 12 inside the main body 2 (FIG. 1). Each cartridge holder 60 is provided with a shelf or a guide rail (not shown in the drawings) to hold the upper and lower cartridges 7, 8. The cartridge holders 60 are further provided with track wheels 61 and ride independently from rails 62 provided on the cart 19 within an axial direction perpendicular to the axial direction in which the cart 19 runs, to rails 63 provided in each tool magazine 3a. In other words the axial direction within which the cartridge holders 60 move and the axial direction within which the upper and lower cartridges 7, 8 are inserted and removed from the cartridge holders 60 is the same.

The cart 19 is arranged to run independently on the rails 20 provided in a U-shaped guide member 64 and is run along the rail by a driving device comprised of a continuous driving chain 65 and a driving motor (not shown in the drawings). Fixed stoppers 66 are provided on the upper surface of the cart 19 and holder lock members 67 are provided above and below the cart 19 for positioning the cartridge holders 60. The fixed stoppers 66 and the holder lock members 67 secure the rolling cartridge holders 60. The holder lock members 67 are normally kept in the locked position, and are unlocked by a holder lock release device 68 which is comprised of an air cylinder provided at the location of each tool magazine 3a.

Cartridge holder loading and unloading devices 69 are provided inside each tool magazine 3a. These cartridge holder loading and unloading devices 69 are provided with peg receiving members 71 which interlock with an interlocking peg 70 that juts out from the bottom of the cartridge holder 60, and are provided with a continuous holder moving chain 73 that drives the advance and withdrawal of the peg receiving members 71. Each holder moving chain 73 is attached to a sprocket 76 which is joined via an electromagnetic clutch 75 to a drive shaft 74 arranged along the track of the cart 19. The drive shaft 74 is connected to the drive source, and rotationally driven. Consequentially, the holder moving chain 73 at the desired tool magazine 3a can be driven by switching on and off the electro-magnetic clutch 75.

The cartridge exchange operation will now be explained in reference to FIG. 10.

Figure 10A:
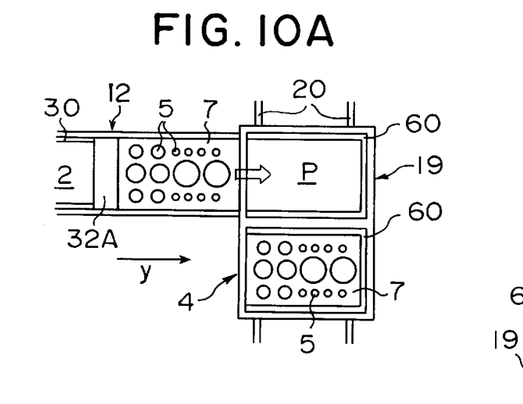
FIGS. 10A, 10B, 10C, 10D and 10E are diagrams explaining the operation of the tool exchange device in a punch press machine of the present invention.

As shown in FIG. 10A, the open cartridge holder 60 of the cart 19 which has been loaded with the new cartridges 7, 8 in the other cartridge holder 60 stops at a position corresponding to the cartridge moving means 12 (the tool exchange position P) at the punch press main body 2. In this condition, the cartridges 7, 8 from the main body 2 are inserted into the empty cartridge holder 60 by the driving of the cartridge moving means 12.

Figure 10B:
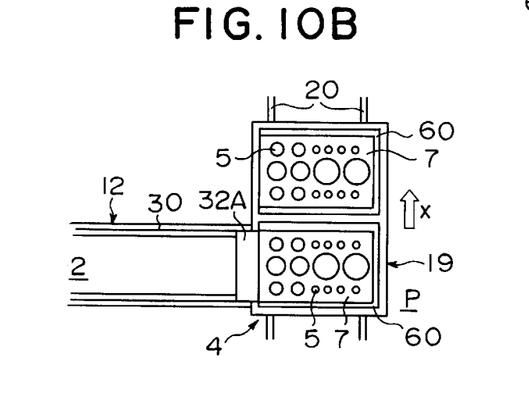
Figure 10C:
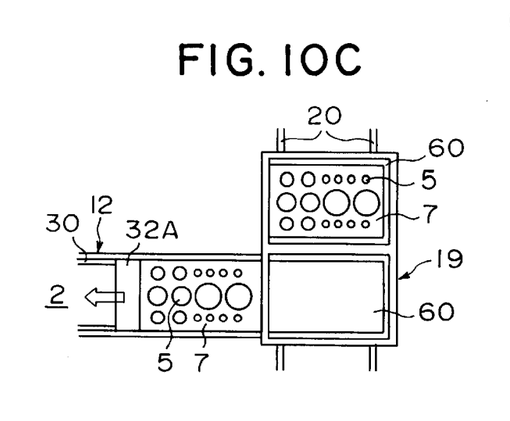
Figure 10D:
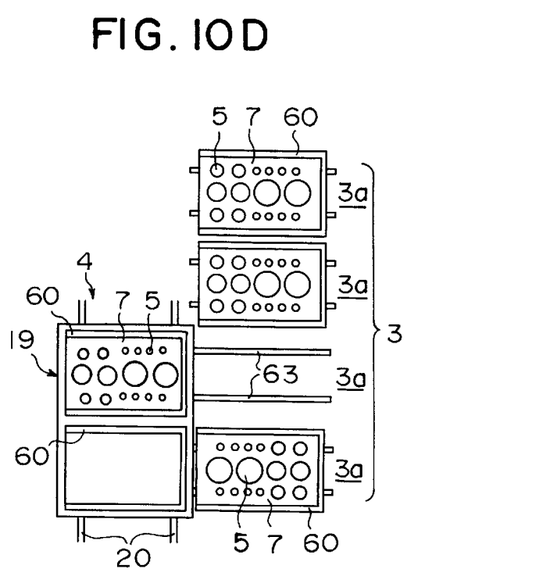

Next, the cart 19 is moved in the X axial direction, where the new cartridges 7, 8, and the cartridge holders with the new cartridges 7, 8 are moved to cartridge exchange position P (FIG. 10B). There the new cartridges 7, 8 of the cartridge holder 60 are then guided inside the main body 2 by the cartridge moving means 12 (FIG. 10C).

The cart 19 with the discarded cartridges 7, 8 is then sent to the position corresponding to the empty tool magazine 3a of the tool magazine group 3 (FIG. 10D) where the cartridges 7, 8 from the cartridge holder 60 are replaced in their tool magazine 3a.

Figure 10E:
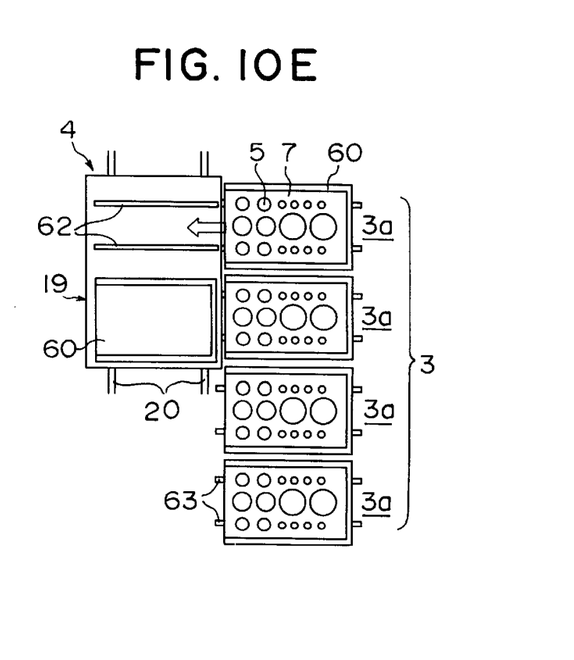

Next, in order to prepare the new cartridges 7, 8, the cart 19 is sent to the desired tool magazine 3a where the stored cartridges 7, 8 are loaded onto the cartridge holder 60 of the cart 19 (FIG. 10E).

Thus by providing the cart 19 with the two cartridge holders 60, the cartridges 7, 8 can be exchange with minimal movement of the cart 19, and the number of cartridge 7, 8 exchanges can be reduced.

Further, in this embodiment, the two cartridge holders 60 arranged in the cart 19 may be fixed to the cart 19 such that only the cartridges 7, 8 are stored in the tool magazines 3a. This reduces the amount of time required for tool and cartridge replacement.

Figure 11:
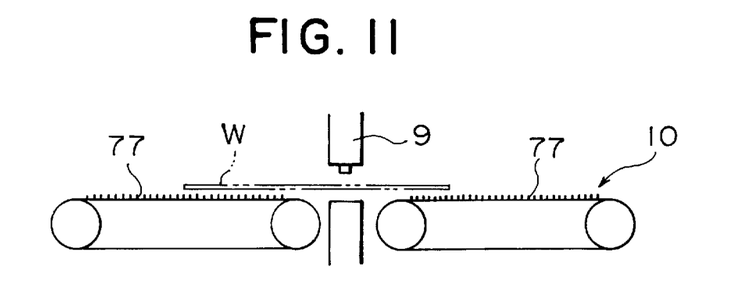
FIG. 11 is a cross section diagram showing the structure of an embodiment of the work table of the punch press machine of the present invention in outline form.

Further still, in the present embodiment, a work holding continuous belt 77 (as shown in FIG. 11) rotationally driven in the direction of the work moving direction is provided on the top of the work table 10 in FIG. 1, and the continuous belt 77 may be rotated in accordance with the work moving by the work moving means 11 (shown in FIG. 1). In this way, when work sheet W is moved, the bottom surface of the work sheet W is not chaffed, and abrasions can be reliably prevented from forming on the bottom of the work sheet W.

Still further, in the present embodiment, the work moving means 11 may clamp one of the ends of the work sheet W extending in the axial direction in which it is moved with a work holder 78, and advance and withdraw a moving body 79 attached to the work holder 78 by running the moving body 79 along a rail 80 extending back and forth along the length of the work table 10.

The above described punch press machine provided with a work moving means for moving the work in a first axial direction, a work table which extends in the same axial direction, and a tool moving means for moving tools within a second axial direction perpendicular to the first axial direction in which the work is moved, further comprises a tool magazine group which arranges a plurality of tools parallel to the work table, and since a tool exchange device which can move within the same axial direction as the work sheet is arranged between the tool magazine group and the work table, the amount of space taken up by the machine is reduced, and retooling can be simplified.

When the tool magazine group is arranged to fit within roughly the same length of the work table, an entire row of tool magazine groups can be prepared without increasing the amount of space the machine takes up during operation.

Further, when a plurality of tools are held in a cartridge and each tool magazine of the tool exchange device and the tool magazine groups contain replacement tools for each cartridge, a plurality of tools can be exchanged at the same time, so the number of times tools are exchanged during processing of a single work sheet can be reduced or brought to zero, thus improving the processing efficiency of the machine.

I claim:

1. A punch press provided with a work moving means for moving a work sheet only within a first axial direction, a work table arranged along said axial direction, a tool moving means for moving tools in a second axial direction perpendicular to said first axial direction, a tool magazine group wherein a plurality of tool magazines are arranged in a line in parallel to said work table, and a tool exchange device arranged between said tool magazine group and said work table such that it can move within said first axial direction wherein the tool exchange device exchanges tools stored in said tool magazines with tools held by said tool moving means and the second axial direction is in parallel to the direction of the face of the work table and perpendicular to the first axial direction.

2. The punch press machine as in claim 1 wherein said tool magazine group is approximately the same length as said work table.

3. The punch press machine as in claim 1 wherein a plurality of said tools are held in cartridges, and each tool magazine of said tool exchange means and said tool magazine group stores and exchanges tools for each of said cartridges.

4. The punch press machine as in claim 2 wherein a plurality of said tools are held in cartridges, and each tool magazine of said tool exchange means and said tool magazine group stores and exchanges tools for each of said cartridges.

5. The punch press machine as in claim 1, wherein the work table, the tool exchange device and the tool magazine group are arranged, and lined up, in the same direction.

* * * * *